United States Patent [19]
Vandepitte

[11] Patent Number: 6,105,710
[45] Date of Patent: Aug. 22, 2000

[54] TRANSMISSION FOR A VEHICLE HAVING A MOTOR ARRANGED OUTSIDE ITS LONGITUDINAL CENTER PLANE

[75] Inventor: Bart Vandepitte, Wingene, Belgium

[73] Assignee: Clark Equipment Beigium N.V., Bruges, Belgium

[21] Appl. No.: 09/215,332

[22] Filed: Dec. 18, 1998

[30] Foreign Application Priority Data

Apr. 11, 1998 [EP] European Pat. Off. ............. 98106691

[51] Int. Cl.$^7$ ................................................. B60K 17/22
[52] U.S. Cl. ......................... 180/376; 180/337; 180/344; 180/347; 74/606 R
[58] Field of Search .................................. 180/344, 347, 180/337, 376; 74/606 R

[56] References Cited

U.S. PATENT DOCUMENTS

| | | | |
|---|---|---|---|
| 2,446,854 | 8/1948 | Schroeder | 192/70.1 |
| 2,805,743 | 9/1957 | Keese | 192/70.1 |
| 3,064,746 | 11/1962 | Williamson | 180/54.1 |
| 3,331,464 | 7/1967 | Van Doorne | 180/244 |
| 5,426,991 | 6/1995 | Ohkawa et al. | 74/331 |
| 5,632,354 | 5/1997 | Kashiwase et al. | 180/344 |

FOREIGN PATENT DOCUMENTS

| | | |
|---|---|---|
| 1927737 | 2/1990 | Germany . |
| 2909232 | 10/1959 | U.S.S.R. . |
| 3677358 | 7/1972 | U.S.S.R. . |

*Primary Examiner*—Brian L. Johnson
*Assistant Examiner*—Deanna Draper
*Attorney, Agent, or Firm*—Liniak, Berenato, Longacre & White

[57] ABSTRACT

A transmission (14) for a vehicle (2) having a motor (9) including a motor unit (33) and an output shaft, the motor (9) being arranged outside the longitudinal center plane (7) of the vehicle (2). The transmission (14) comprises a reducing transmission (19) including a housing (22) for a fixed connection to the motor unit (33) and an output shaft (37) arranged out of line with respect to its input shaft (16), a transfer transmission (21) for driving drive shafts (11) arranged in the region of the longitudinal center plane of the vehicle (2), the transfer transmission (21) including a housing (27) and an output shaft (18) arranged out of line with respect to its input shaft (38). The housing (27) of the transfer transmission (21) is provided for a fixed connection to the housing (22) of the reducing transmission (19). A relative position of the housing (22) of the reducing transmission (19) with respect to the motor unit (33) is adjustable about the input shaft (16) of the reducing transmission (19), and a relative position of the housing (27) of the transfer transmission (21) with respect to the housing (22) of the reducing transmission (19) is adjustable about the input shaft (38) of the transfer transmission (21) to mutually adjust a height distance (23) between the output shaft of the motor (9) connected to the input shaft (16) of the reducing transmission (19) and a connecting point of the drive shafts (11) and the output shaft (18) of the transfer transmission (21) and a lateral distance (24) between the output shaft of the motor (9) connected to the input shaft (16) of the reducing transmission (19) and a connecting point of the drive shafts (11) and the output shaft (18) of the transfer transmission (21).

19 Claims, 7 Drawing Sheets

TRANSMISSION FOR A VEHICLE HAVING A MOTOR ARRANGED OUTSIDE ITS LONGITUDINAL CENTER PLANE

FIELD OF THE INVENTION

The invention generally relates to a transmission for a vehicle having a motor arranged outside the longitudinal center plane of the vehicle. More particularly, the invention relates to a transmission of a telescopic boom handler including a reducing transmission and a transfer transmission.

BACKGROUND OF THE INVENTION

A telescopic boom handler has a boom arranged in the longitudinal center plane of the vehicle. The boom is telescopable and can be raised about a horizontal axis. A fork is provided at the free end of the boom to lift loads. Due to the arrangement of the raisable and telescopable boom inside the longitudinal center plane of the vehicle, it makes sense to arrange the motor as well as the driver's cabin of the vehicle outside the longitudinal center plane. Typically, the motor is arranged on the one side of the longitudinal center plane, and the driver's cabin is arranged on the other side of the longitudinal center plane of the vehicle. Due to the arrangement of the motor outside the longitudinal center plane of the vehicle, it is necessary to transfer the torque of the motor to the longitudinal center plane of the vehicle where drive shafts leading to the axles of the vehicle to be driven are ideally located. Therefore, a transmission has to be provided to transfer the torque. The present invention relates to such a transmission. At the same time, the transmission is a reducing transmission for the motor, and it usually includes different gears, i.e. different transmission ratios or multiplication factors. The transmission ratios can be changed either manually or automatically which is not essential to the present invention.

A transmission for a vehicle having a motor arranged outside the longitudinal center plane of the vehicle is used in a telescopic boom handler of the firm "Caterpillar". The transmission comprises a reducing transmission to be rigidly connected to a motor arranged at a few degrees outside the longitudinal center plane of the vehicle. A cardan shaft connection is provided between the output shaft of the reducing transmission and the input shaft of the transfer transmission directly driving the drive shafts. The cardan shaft connection compensates for the angle between the motor and the longitudinal center plane of the vehicle. Due to the cardan shaft connection between the transfer transmission and the reducing transmission, the transmission is very big. Additionally, the cardan shaft connection requires a very exact geometrical arrangement of the components to compensate wow and flutter of the cardan joints.

Another known transmission for a vehicle having a motor arranged outside the longitudinal center plane of the vehicle is used in a telescopic boom handler of the firm "Gehl". The transmission includes a transfer transmission to be connected to the motor. The motor transmits the torque to a reducing gear arranged in the longitudinal center plane of the vehicle. The reducing gear drives the drive shafts of the vehicle. Due to the reducing transmission being arranged in the longitudinal center plane of the vehicle, the transmission requires a lot of room. Additionally, it is disadvantageous to transmit non-reduced revolutions of the motor by the transfer transmission since wear of the transfer transmission is increased thereby.

SUMMARY OF THE INVENTION

Briefly described, the present invention comprises a transmission for a vehicle having a motor arranged outside the longitudinal center plane of the vehicle. The motor has a motor unit and an output shaft. The transmission includes a reducing transmission including a housing for a fixed connection to the motor unit and an output shaft arranged out of line with respect to its input shaft. A transfer transmission for driving drive shafts is arranged in the region of the longitudinal center plane of the vehicle. The transfer transmission includes a housing and an output shaft arranged out of line with respect to its input shaft. The housing of the transfer transmission is provided for a fixed connection to the housing of the reducing transmission. A relative position of the housing of the reducing transmission with respect to the motor unit is adjustable about the input shaft of the reducing transmission, and a relative position of the housing of the transfer transmission with respect to the housing of the reducing transmission is adjustable about the input shaft of the transfer transmission to mutually adjust a height distance between the output shaft of the motor connected to the input shaft of the reducing transmission and a connecting point of the drive shafts and the output shaft of the transfer transmission and a lateral distance between the output shaft of the motor connected to the input shaft of the reducing transmission and a connecting point of the drive shafts and the output shaft of the transfer transmission.

The connection of the transfer transmission and the reducing transmission results in especially compact dimensions of the entire transmission. Additionally, due to the pivotability of the reducing transmission with respect to the motor and of the transfer transmission with respect to the reducing transmission, different height or vertical differences and lateral differences between the motor and the drive shafts are adjustable with one and the same transmission. During this adjustment, a pivotal movement of the transfer transmission with respect to the output shaft, i.e. with respect to the drive shafts, occurs. The pivoting axis of the motor and the reducing transmission, of the reducing transmission and the transfer transmission, and of the transfer transmission and the drive shafts are defined by the shafts arranged coaxially to the concerned connecting point. These shafts are the output shaft of the motor and the input shaft of the reducing transmission, the output shaft of the reducing transmission and the input shaft of the transfer transmission, and the output shaft of the transfer transmission and the portion of the drive shafts connected thereto. The drive shafts may have several cardan joints.

To cover a great portion of the height distance and the lateral distance between the motor and the drive shafts with the novel pivotability, it makes sense that the lateral distance of the input shafts and of the output shafts of the reducing transmission and of the transfer transmission are approximately the same. In these cases, relatively small angles occur between the reducing transmission and the transfer transmission for most of the height distances and the lateral distances, which results in an advantageous construction.

These constructive advantages are especially important if the output shaft of the reducing transmission exits the housing of the reducing transmission on the same side as the input shaft enters the housing. In this case, the transfer transmission connected to the reducing transmission is arranged laterally adjacent to the reducing transmission and/or the motor. This arrangement comprises an especially compact structure of the transmission. At the same time, the pivotal movement of the transfer transmission with respect to the reducing transmission is limited by the reducing transmission and the motor, respectively.

To realize the transmission, it is neither necessary that the housing of the reducing transmission is continuously pivotable with respect to the motor unit, nor that the housing of the transfer transmission is continuously pivotable with respect to the housing of the reducing transmission. For a secure receiving of the torque occurring between the components about the pivoting axis, it is rather advantageous if the housing of the reducing transmission is connectable to the motor unit and the housing of the transfer transmission is connectable to the housing of the reducing transmission in a limited number of discrete pivoting positions. The number of pivoting positions should at least be six. Preferably, the number is eight.

If a rigid adapter ring is arranged between the housings of the reducing transmission and the transfer transmission, the adapter ring may be designed to provide an exact adjustment of the angle position between the two housings. For example, fixing bores provided in two flanges arranged at both ends of the adapter ring may be spaced apart from one another at a definite angle about the axis of the adapter ring. Thus, the design of the adapter ring itself realizes a means to adjust the angle position.

Further, the transmission may be designed to compensate an angle between the motor and the longitudinal center plane of the vehicle without cardan shaft joints being provided between the motor and the drive shafts. This is possible since a non-zero angle is provided between the input shaft and the output shaft of the reducing transmission and/or between the input shaft and the output shaft of the transfer transmission. To realize this angle other than zero angle, the reducing transmission and the transfer transmission, respectively, may include at least a one face gear or at least two conical gears engaging each other. If the two conical gears are oriented the same way with respect to their gear diameter, the angle between their rotation axis is as big as the average opening angle of the two conical gears.

A vehicle with a motor including a motor unit and an output shaft, the motor being arranged outside the longitudinal center plane of the vehicle, includes a transmission arranged between the motor and the drive shafts. Typically, the drive shafts lead to a front axle differential of a front axle and to a rear axle differential of a rear axle of the vehicle. Thus, the vehicle has a four wheel drive. The vehicle may be a telescope boom handler, i.e. a telescopic boom handler, having a boom arranged in the longitudinal center plane of the vehicle and to be raised about a horizontal axis.

It is an object of the present invention to provide a transmission for a vehicle having a motor arranged outside the longitudinal center plane of the vehicle that has compact dimensions.

Another object of the present invention is to provide a transmission for a vehicle having a motor arranged outside the longitudinal center plane of the vehicle that is very variable with respect to its usage in vehicles with different relative positions of the motor with respect to the drive shafts.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
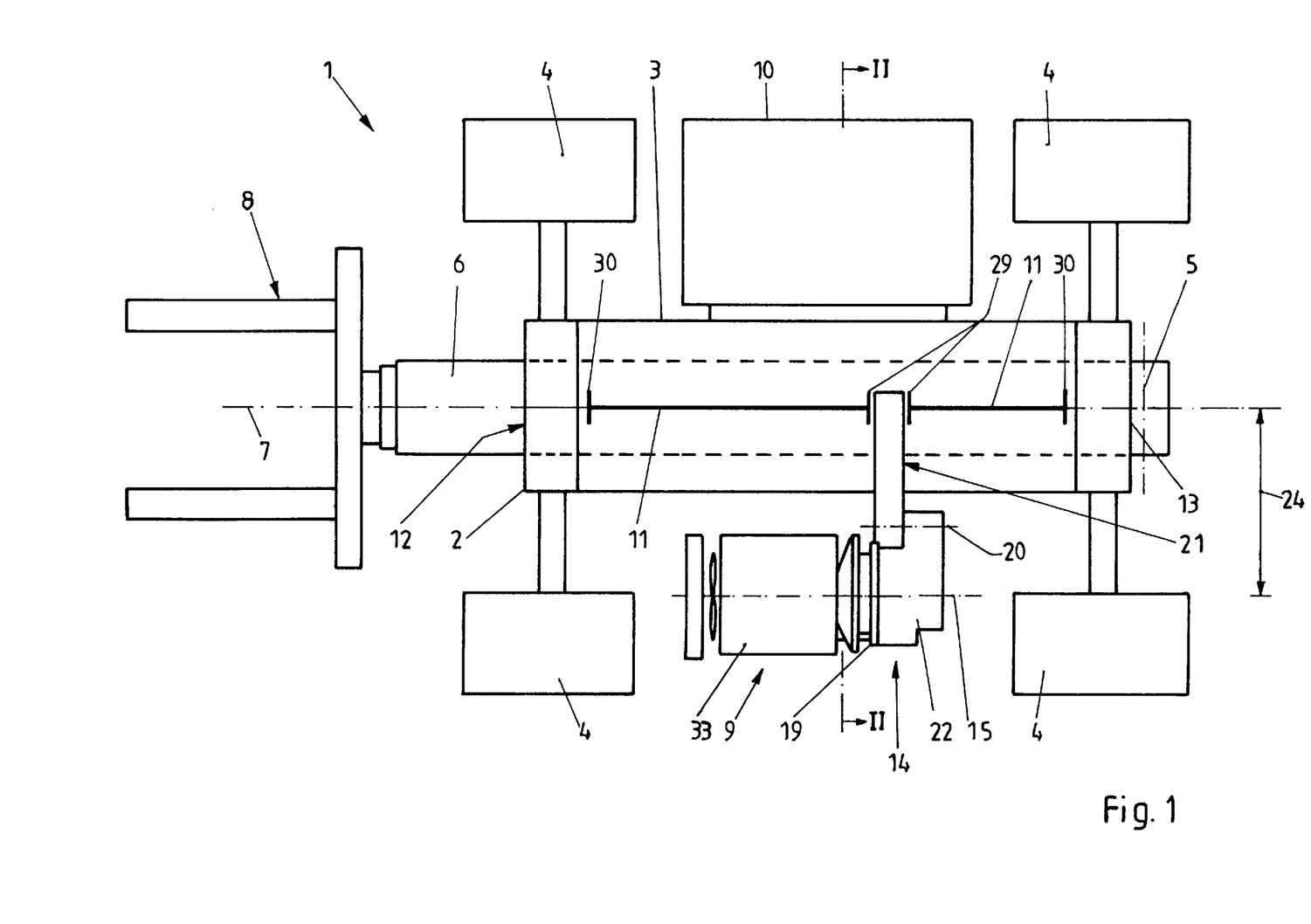
FIG. 1 is a schematic view from below of a telescoping boom handler having a transmission in a first embodiment.
Figure 2:
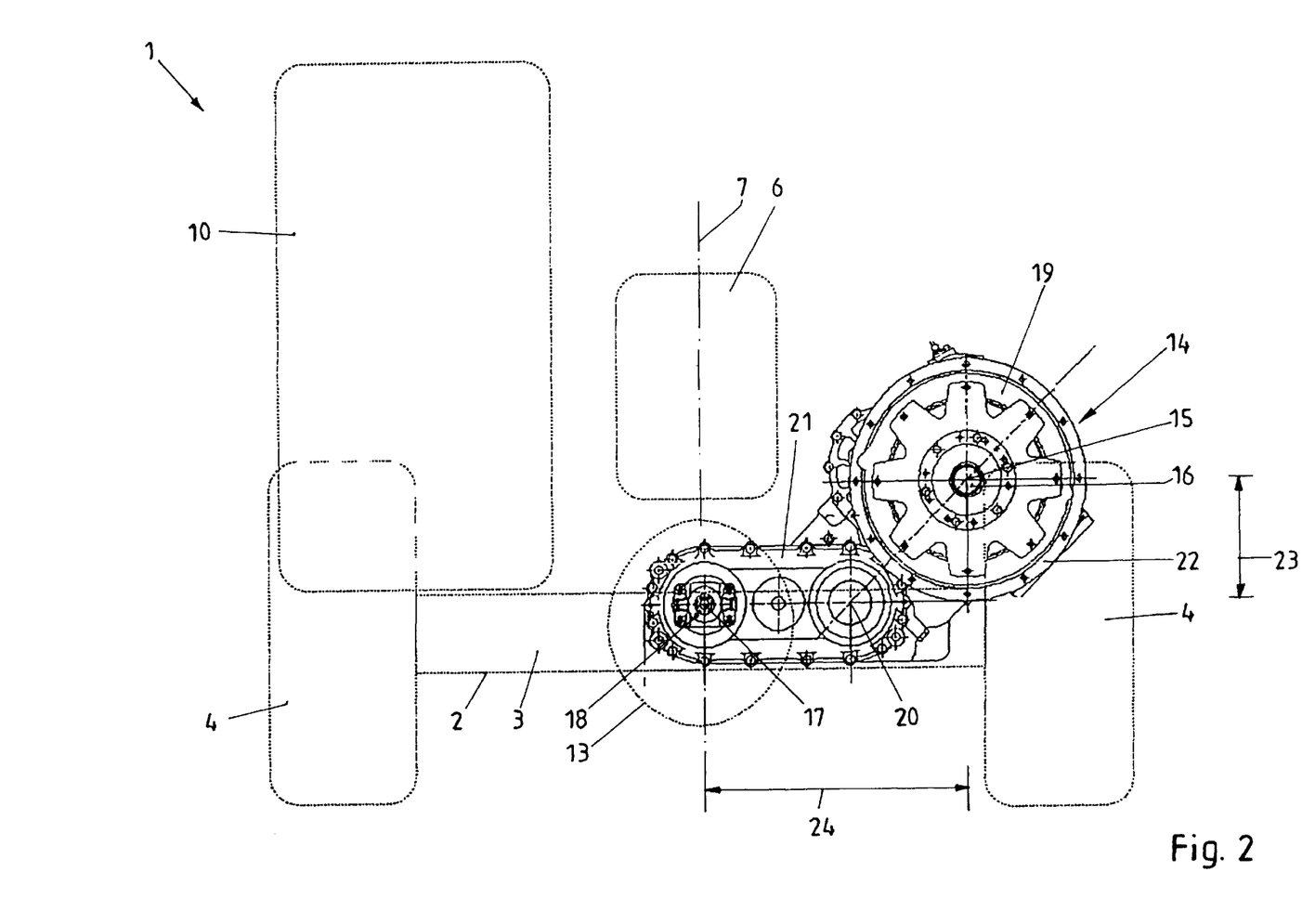
FIG. 2 is a schematic cross section of the telescoping boom handler according to line 11—11 in FIG. 1.

FIGS. 1 and 2 illustrate a telescoping boom handler 1 which is a vehicle 2 having a frame 3 and four driven wheels 4. A telescopable boom 6 is pivotally arranged about a horizontal axis 5 on the frame 3. The boom 6 can be raised in the longitudinal center plane 7 of the vehicle 2 about the axis 5 with respect to the frame 3, for example with a hydraulic cylinder which is not shown here. Furthermore, the boom 6 is telescopable in the longitudinal center plane 7 of the vehicle 2. That means that the boom 6 includes a number of segments that are movable with respect to one another. The boom 6 carries a fork 8 at its free end to pick up and to unload loads. The vehicle 2 includes a motor 9 having a motor unit 33. The motor unit 33 of the motor 9 is arranged out of line with respect to the vehicle 2, i.e. with a lateral distance to the longitudinal center plane 7 of the vehicle 2. A driver's cabin 10 is provided on the other side of the longitudinal center plane 7 to oppose the motor 9. Drive shafts 11 leading to a front axle differential 12 and a rear axle differential 13 of the vehicle 2 are arranged in the longitudinal center plane 7 of the vehicle 2. Consequently, the torque of the motor 9 has to be transmitted to the drive shafts 11 with a transmission 14 overcoming a lateral distance and a height distance between the output shaft of the motor 9 and the drive shafts 11. The output shaft (not shown here) of the motor 9 rotates about a same axis 15 as an input shaft 16 of the transmission 14 shown in FIG. 2. The input shaft 16 is arranged above and laterally adjacent to an axis 17 in the longitudinal center plane 7 of the vehicle 2. The output shaft 18 of the transmission 14 and the connected elements of the drive shafts 11 rotate about this axis 17.

Figure 3:
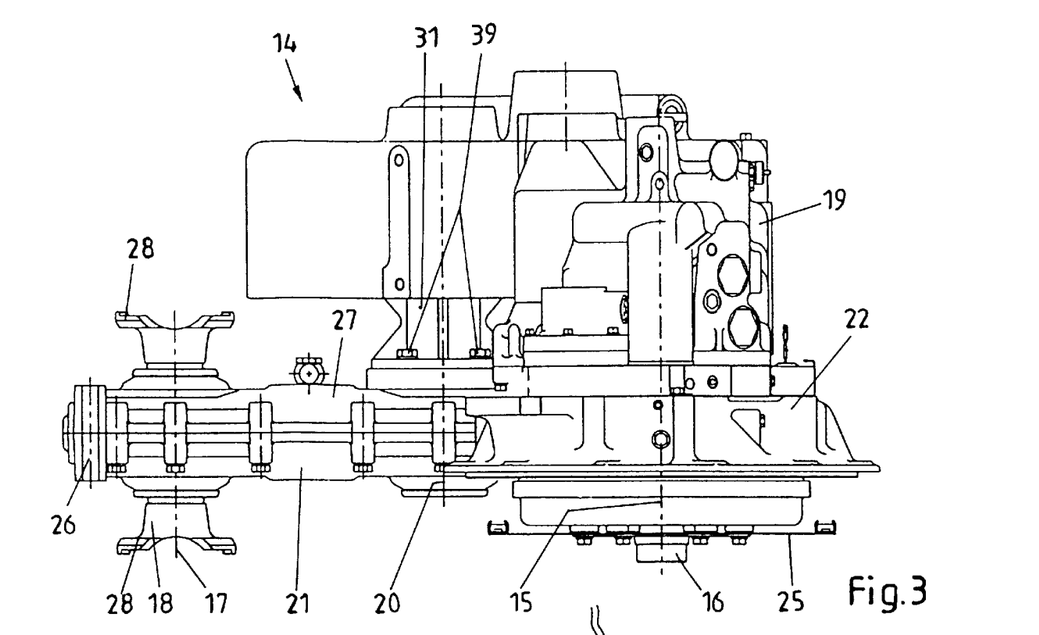
FIG. 3 is a radial view of the transmission of the telescoping boom handler according to FIGS. 1 and 2.
Figures 4, 6:
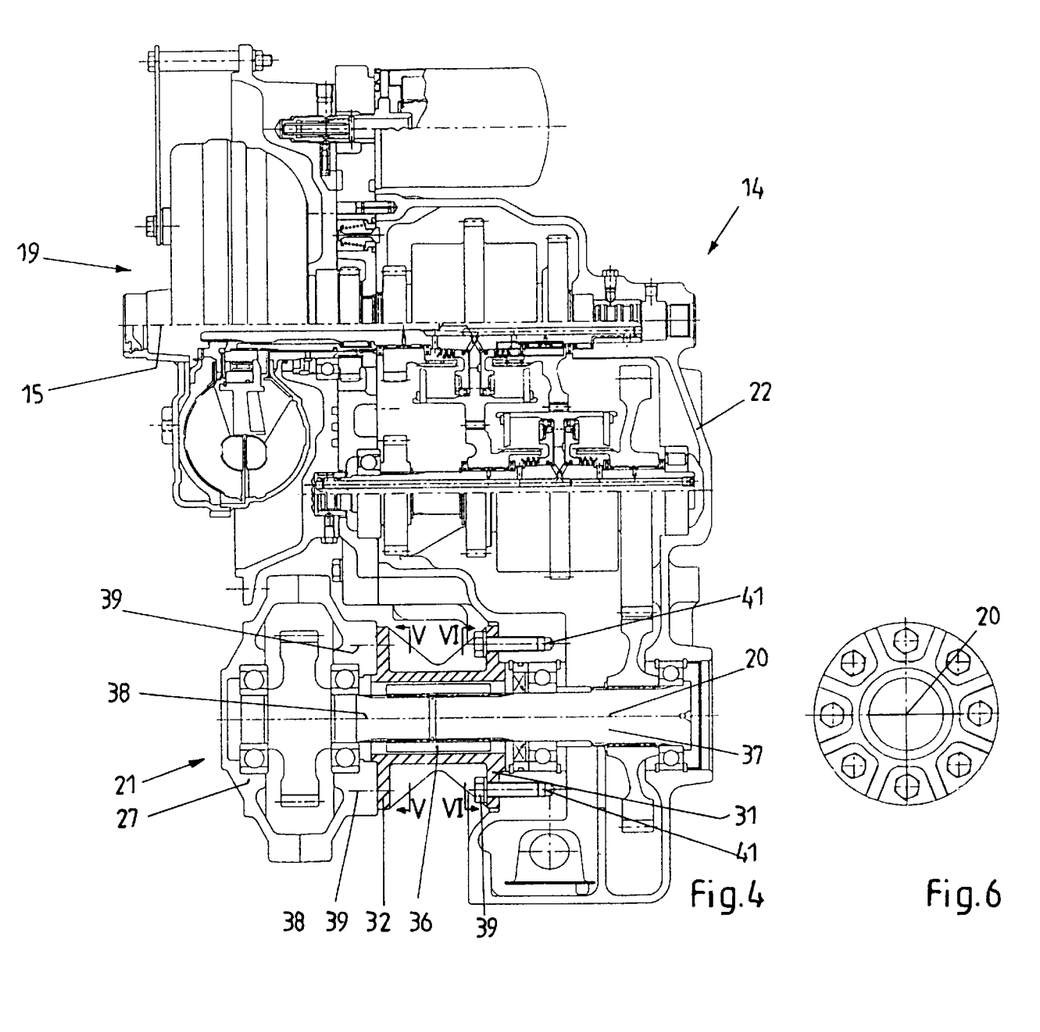
FIG. 4 is another radial, partly broken away, view of the transmission according to FIG. 3 in a direction approximately perpendicular to FIG. 3.
FIG. 6 is an axial view of a second flange of the adapter ring according to FIG. 5, according to line VI—VI in FIG. 4.
Figure 7:
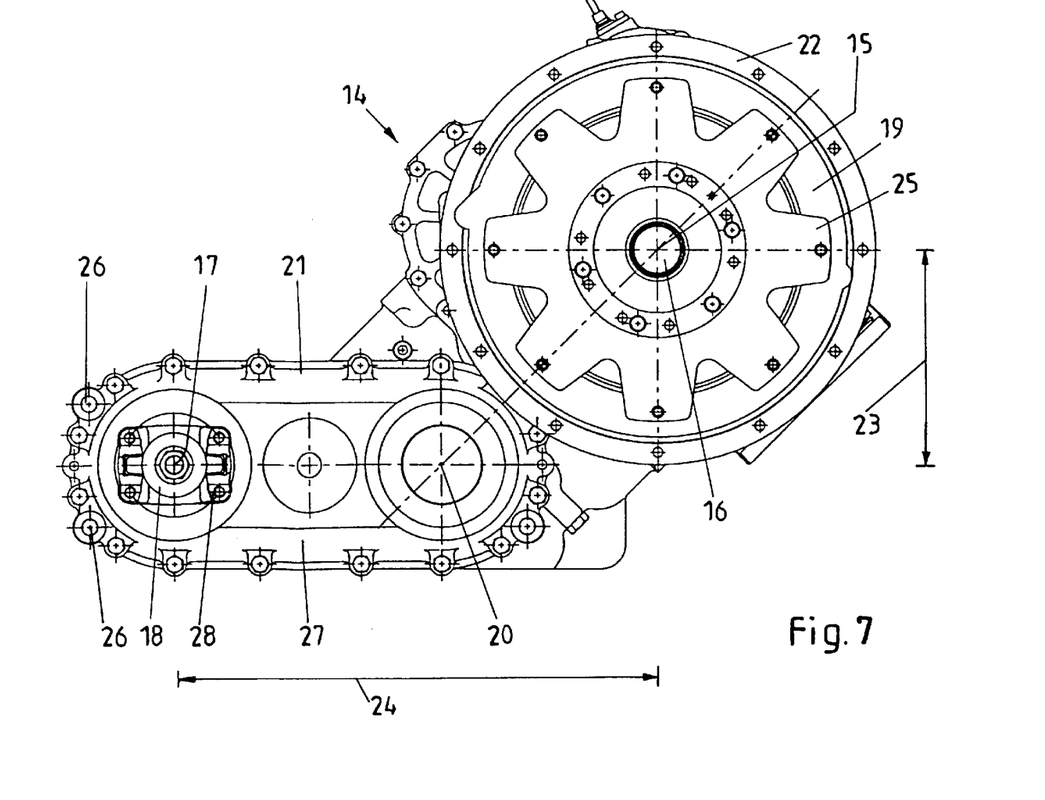
FIG. 7 is an axial view of the transmission according to FIGS. 3 and 4.

The transmission 14 is divided into two separable subassemblies as it can be seen from FIGS. 3, 4 and 7 solely illustrating the transmission 14. A housing 22 of a reducing transmission 19 reducing the number of revolutions of the output shaft of the motor 9 is directly connected to the motor unit 33 of the motor 9. The shown embodiment of the reducing transmission 19 is a shifting transmission having several gears and an automatic clutch. As shown in FIG. 4, an output shaft 37 of the reducing transmission 19 rotates about an axis 20. An input shaft 38 of a transfer transmission 21 of the transmission 14 shown in FIG. 4 is arranged coaxial to the axis 20 and rigidly connected to the output shaft 37 of the reducing transmission 19 by a bush 36. The transfer transmission 21 substantially transmits the torque from the reducing transmission 19 to the drive shafts 11; therefore, it may also be called a drop box. However, it may provide an additional predetermined reduction or multiplication for the number of revolutions of the output shaft of the reducing transmission 19. The output shaft 18 of the transfer transmission 21 is the output shaft of the entire transmission 14 and rotates with the input elements of the drive shafts 11 about the axis 17. The input shaft and the output shaft of the reducing transmission 19 as well as of the transfer transmission 21 are arranged in parallel to each other. In both cases, the offset is approximately the same. The connecting points for the motor unit 33 and a housing 27 of the transfer transmission 21 are located on the same side of the housing 22 of the reducing transmission 19, so that the transfer transmission 21 is located in a compact manner adjacent to the motor unit 33. Different angles between the reducing transmission 19 and the motor 9 and the transfer transmission 21 and the reducing transmission 19, respectively, are adjustable in the connecting point of the housing 22 of the reducing transmission 19 and the motor unit 33 and of the housing 27 of the transfer transmission 21 and the housing 22 . In this way, different height distances 23 and lateral distances 24 between the axis 15 and the axis 17 can be compensated for with the same transmission 14. This will be explained in greater detail with reference to FIGS. 7 to 10.

Figure 5:
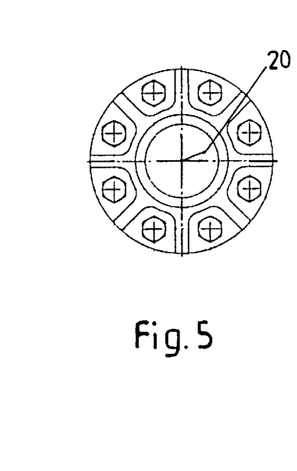
FIG. 5 is an axial view of a first flange of an adapter ring being a part of the transmission according to FIGS. 4 and 3 and 4, according to line V—V in FIG. 4.

FIGS. 3, 4 and 7 illustrate detailed structures of the transmission 14. It can be seen that a continuous turning of the housing 22 of the reducing transmission 19 with respect to the motor unit 33 (not shown here) and of the housing 27 of the transfer transmission 21 with respect to the housing 22 of the reducing transmission 19 is not provided here. A flange 25 is formed as a star to fix the housing 22 of the reducing transmission 19 to the motor unit 33 (not shown here). The star is eight times symmetric, so that the housing 22 can be fixed to the motor unit 33 in eight discrete turning positions. The shown embodiment of the connection between the housing 22 of the reducing transmission 19 and the housing 27 of the transfer transmission 21 is also formed to be symmetric eight times. An adapter ring 31 having two flanges 23 and 34 arranged at both ends of the adapter ring 31 is located between the housings 22 and 27. The adapter ring 31 can be seen in FIG. 4; the flanges 32 and 34 can also be seen in FIGS. 5 and 6. Each flange 32 and 34 has eight fixing bores 35 arranged symmetrically about the axis 20. The bores 35 are arranged in the flanges 32 and 34 about the axis 20 spaced apart from each other at π/8. The angle offset may also be different from π/8 to compensate a certain height distance 23 or lateral distance 24. The angle offset may be the exclusive means to determine the relative position of the housings 22 and 27. In this case, the fixing bores 35 do not have to be arranged symmetrically in the flanges 32 and 34. Fixing screws 39 extend through the fixing bores 35 in the flanges 32 and 34 and engage threaded bores 41 in the housings 22 and 27. The bush 36 is arranged inside the adapter ring 31 to rigidly connect the output shaft 37 to the input shaft 38. Fixing bores 26 also allow for different turning positions spaced apart at 45 degrees or π/4, respectively. The fixing bores 26 support the free end of the housing 27 of the transfer transmission 21 on the frame 3 according to FIG. 1 to determine the connecting point of the drive shafts 11 (not shown here) and the output shaft 18 of the transfer transmission 21. The actual connecting point of the drive shafts 11 and the output shaft 18 of the transfer transmission 21 is realized by a cardan joint, whereby the output shaft 18 at each of its two ends directly verges into a fork 28. In FIG. 1, the cardan joints 29 are indicated by vertical lines. Further cardan joints 30 in front of the front axle differential 12 and the rear axle differential 13 are also indicated by vertical lines. The cardan joints 29 and 30 may be angled in the horizontal center plane 7 of the vehicle 2 up to about seven degrees to prevent them from blocking. Angels substantially above seven degrees result in wow and flutter.

Figure 8:
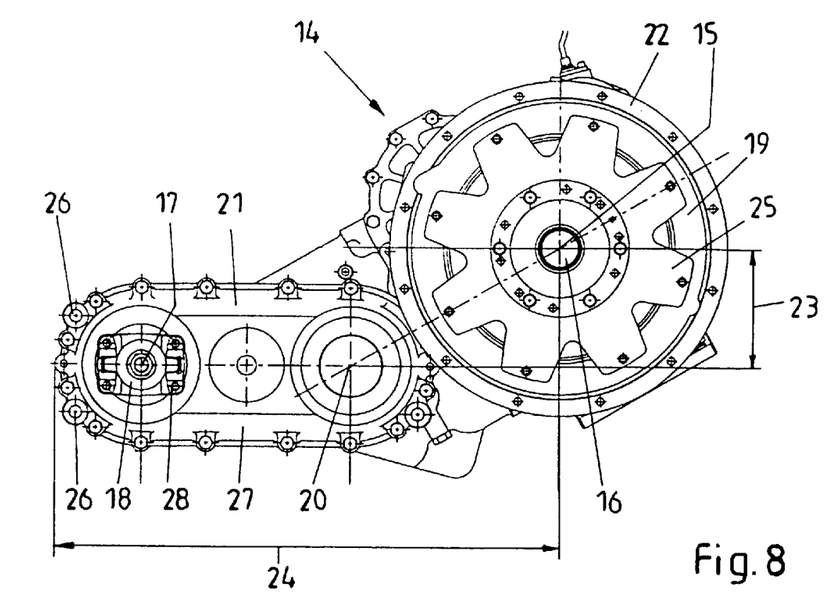
FIG. 8 is an axial view of the transmission according to FIGS. 3 and 4 in a another position.
Figure 9:
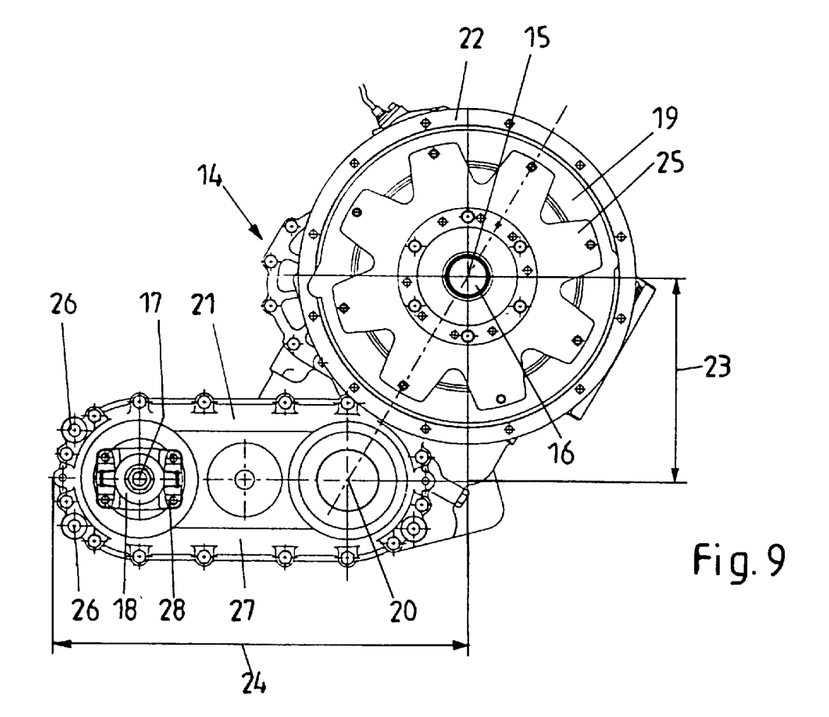
FIG. 9 is an axial view of the transmission according to FIGS. 3 and 4 in a second position.
Figure 10:
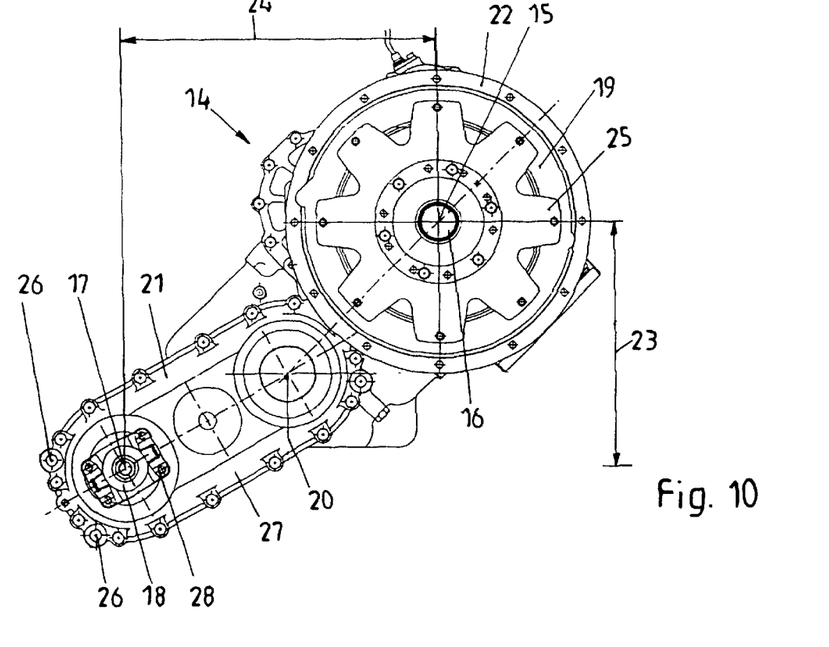
FIG. 10 is an axial view of the transmission according to FIGS. 3 and 4 in a third position.

In FIG. 7 the angle position of the housing 22 of the reducing transmission 19 and of the housing 27 of the transfer transmission 21 corresponds to the assembly of the vehicle 2 according to FIG. 1. FIGS. 8, 9 and 10 show different angle position resulting in different height distances 23 and lateral distances 24 between the output shaft 18 of the transfer transmission 21. Consequently, the transmission 14 having the same components can be used for a multiplicity of different vehicles 2 having different requirements for the height distance 23 and the lateral distance 24.

Figure 11:
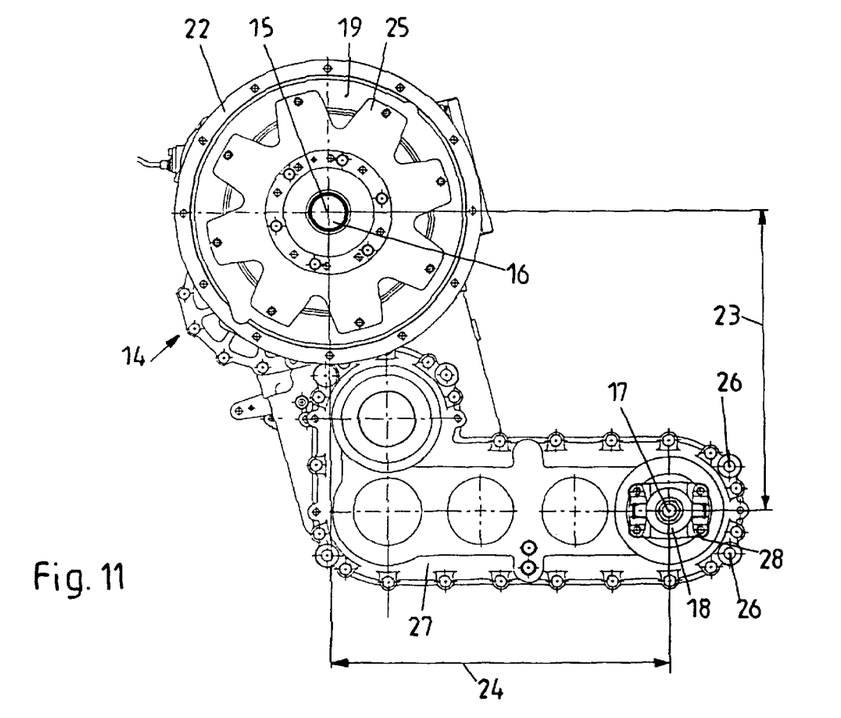
FIG. 11 is an axial view of the transmission in another embodiment.

FIG. 11 illustrates another embodiment of the transmission 14. The essential difference to the other Figs. is that the transfer transmission 21 does not have a rectilinear radial extension but is L-shaped instead. This is advantageous for the assembly of certain types of vehicles.

Figure 12:
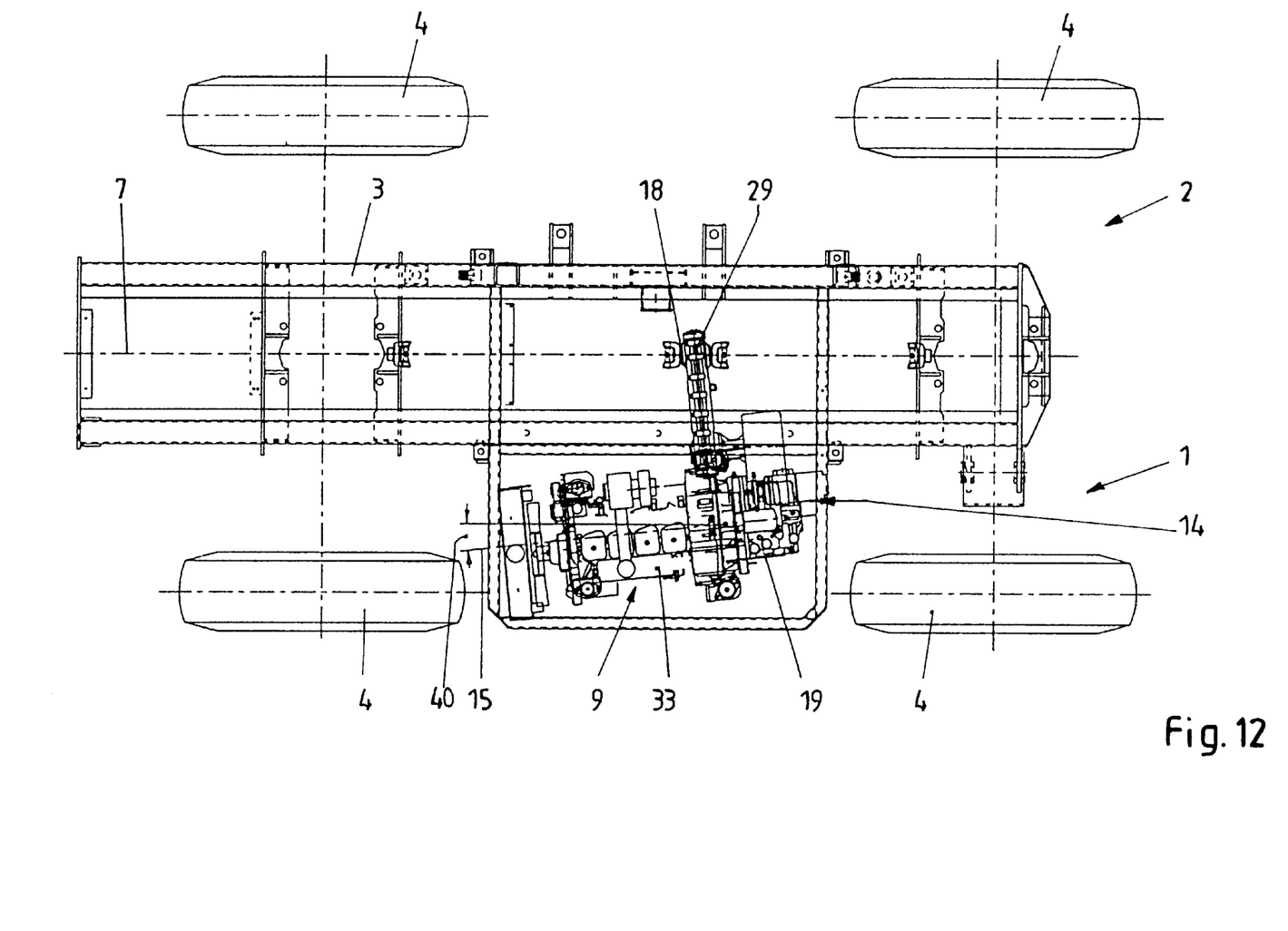
FIG. 12 is a view from below of parts of a telescoping boom handler with another embodiment of the transmission.

The components shown in FIG. 12 are components of a an embodiment of a telescopic boom handler 1 different from the embodiment illustrated in FIG. 1. As illustrated FIG. 12, the motor 9 with the axis 15 is arranged at a turning angle 40 about a vertical axis of approximately six degrees with respect to the longitudinal center plane 7 of the vehicle 2. The turning angle 40 is compensated by the transfer transmission 21, the output shaft 18 of which is arranged at the angle 40 with respect to its input shaft. This arrangement may be realized by a pair of bevel wheels or by a single face gear. Similar to the above described embodiments of the transmission 14, the reducing transmission 19 is again rigidly connected to the motor unit 33, and the transfer transmission 21 is rigidly connected to the reducing transmission 19.

Many variations and modifications may be made to the preferred embodiment of the invention without departing substantially from the spirit and principles of the invention. All such modifications and variations are intended to be included herein within the scope of the present invention, as defined by the following claims.

I claim:

1. A transmission for a vehicle having a motor including a motor unit and an output shaft, the motor being arranged outside the longitudinal center plane of the vehicle, said transmission comprising:

a reducing transmission (19) including a housing (22) for a fixed connection to the motor unit (33) and an output shaft (37) arranged out of line with respect to its input shaft (16);

a transfer transmission (21) for driving drive shafts (11) arranged in the region of the longitudinal center plane of the vehicle (2), said transfer transmission (21) including a housing (27) and an output shaft (18) arranged out of line with respect to its input shaft (38);

wherein said housing (27) of said transfer transmission (21) is provided for a fixed connection to said housing (22) of said reducing transmission (19); and wherein
- a relative position of said housing (22) of said reducing transmission (19) with respect to the motor unit (33) is adjustable about said input shaft (16) of said reducing transmission (19), and
- a relative position of said housing (27) of said transfer transmission (21) with respect to said housing (22) of said reducing transmission (19) is adjustable about said input shaft (38) of said transfer transmission (21) to mutually adjust
- a height distance (23) between the output shaft of the motor (9) connected to said input shaft (16) of said reducing transmission (19) and a connecting point of said drive shafts (11) and said output shaft (18) of said transfer transmission (21), and
- a lateral distance (24) between the output shaft of the motor (9) connected to said input shaft (16) of said reducing transmission (19) and a connecting point of said drive shafts (11) and said output shaft (18) of said transfer transmission (21).

2. The transmission of claim 1, wherein said housing (27) of said transfer transmission (21) is directly connected to said housing (22) of said reducing transmission (19).

3. The transmission of claim 1, further comprising:
an adapter ring to connect said housing (27) of said transfer transmission (21) to said housing (22) of said reducing transmission (19).

4. The transmission of claim 1, wherein said output shaft (37) of said reducing transmission (19) is arranged to exit said housing (22) of said reducing transmission (19) on the same side as said input shaft (16) enters said housing (22).

5. The transmission of claim 1, wherein said housing (27) of said transfer transmission (21) is designed to be connected to said housing (22) of said reducing transmission (19) in a limited number of discrete relative positions.

6. The transmission of claim 1, further comprising:
an adapter ring (31), said adapter ring (31) comprising an axis (20), and two flanges (32, 34) arranged at both ends of said adapter ring (31), each of said flanges having fixing bores (35) surrounding said axis (20).

7. The transmission of claim 6, wherein said fixing bores (35) are arranged on at least one of said two flanges (32, 34) of said adapter ring (31) for an adjustment of a desired relative position of said housing (27) of said transfer transmission (21) about its input shaft (38) with respect to said housing (22) of said reducing transmission (19).

8. The transmission of claim 1, wherein said housing (22) of said reducing transmission (19) is connectable to said motor unit (9) in a limited number of discrete relative positions.

9. The transmission of claim 1, wherein said housing (27) of said transfer transmission (21) is connectable to said housing (22) of said reducing transmission (19) in a limited number of discrete relative positions.

10. The transmission of claim 1, wherein said housing (22) of said reducing transmission (19) is connectable to said motor unit (9) in a limited number of discrete relative positions and said housing (27) of said transfer transmission (21) is connectable to said housing (22) of said reducing transmission (19) in a limited number of discrete relative positions.

11. The transmission of claim 1, wherein an angle other than zero is provided between said input shaft (16) and said output shaft (37) of said reducing transmission (19).

12. The transmission of claim 1, wherein an angle other than zero is provided between said input shaft (38) and said output shaft (18) of said transfer transmission (21).

13. The transmission of claim 1, wherein an angle other than zero is provided between said input shaft (16) and said output shaft (37) of said reducing transmission (19) and between said input shaft (38) and said output shaft (18) of said transfer transmission (21).

14. The transmission of claim 13, wherein said reducing transmission (19) includes at least one face gear.

15. The transmission of claim 13, wherein said reducing transmission (19) includes at least two conical gears.

16. The transmission of claim 13, wherein said transfer transmission (21) includes at least one face gear.

17. The transmission of claim 13, wherein said transfer transmission (21) includes at least two conical gears.

18. A vehicle comprising:
- a motor (9) including a motor unit (33) and an output shaft, said motor (9) being arranged outside the longitudinal center plane (7) of said vehicle (2);
- drive shafts (11) arranged in the region of the longitudinal center plane (7) of said vehicle (2); and
- a transmission (14) arranged between said motor (9) and said drive shafts (11), said transmission comprising a reducing transmission (19) including a housing (22) for a fixed connection to said motor unit (33) and an output shaft (37) arranged out of line with respect to its input shaft (16), a transfer transmission (21) for driving drive shafts (11) arranged in the region of the longitudinal center plane of the vehicle (2), said transfer transmission (21) including a housing (27) and an output shaft (18) arranged out of line with respect to its input shaft (38), wherein said housing (27) of said transfer transmission (21) is provided for a fixed connection to said housing (22) of said reducing transmission (19), and wherein a relative position of said housing (22) of said reducing transmission (19) with respect to the motor unit (33) is adjustable about said input shaft (16) of said reducing transmission (19), and a relative position of said housing (27) of said transfer transmission (21) with respect to said housing (22) of said reducing transmission (19) is adjustable about said input shaft (38) of said transfer transmission (21) to mutually adjust a height distance (23) between the output shaft of the motor (9) connected to said input shaft (16) of said reducing transmission (19) and a connecting point of said drive shafts (11) and said output shaft (18) of said transfer transmission (21) and a lateral distance (24) between the output shaft of the motor (9) connected to said input shaft (16) of said reducing transmission (19) and a connecting point of said drive shafts (11) and said output shaft (18) of said transfer transmission (21).

19. The vehicle of claim 18, wherein said vehicle (2) is a telescoping boom handler (1).

* * * * *